No. 718,489. PATENTED JAN. 13, 1903.
J. W. MADIGIN.
SECONDARY BATTERY.
APPLICATION FILED FEB. 5, 1902.
NO MODEL. 2 SHEETS—SHEET 1.

Witnesses.
L. C. Reynolds
R. Shields

Inventor:
J. W. Madigin
by Fetherstonhaugh & Co.
Attys.

No. 718,489. PATENTED JAN. 13, 1903.
J. W. MADIGIN.
SECONDARY BATTERY.
APPLICATION FILED FEB. 5, 1902.
NO MODEL. 2 SHEETS—SHEET 2.
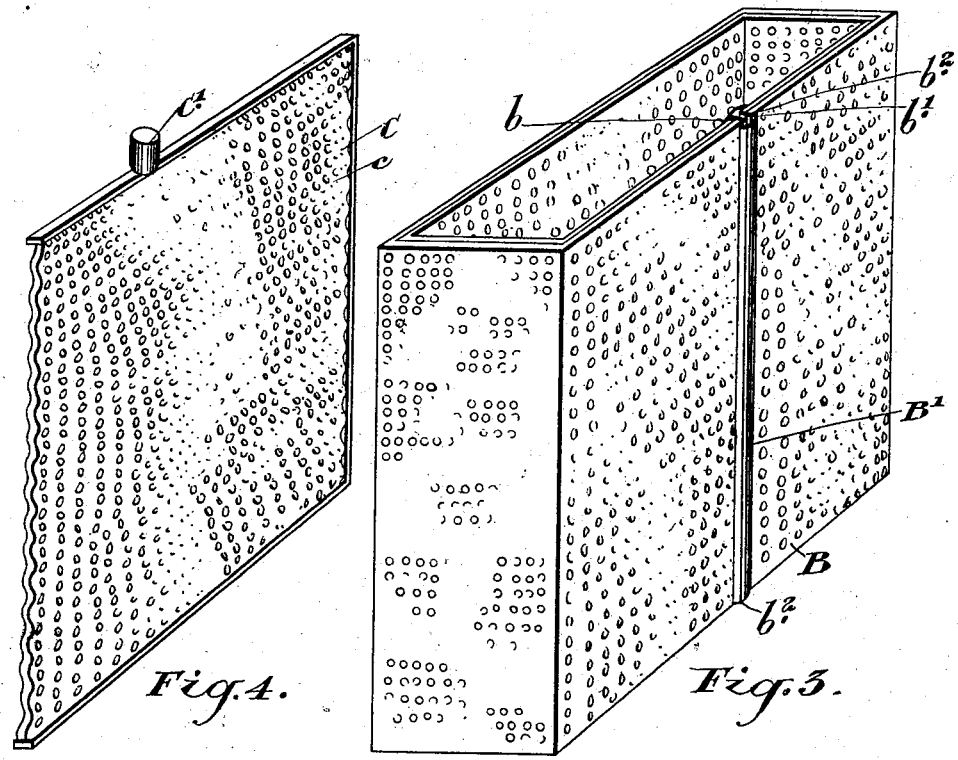
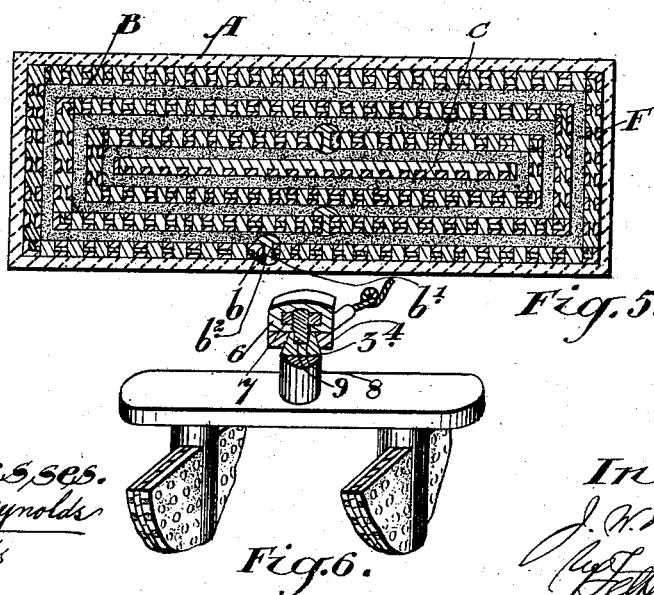
Witnesses.
L. C. Reynolds
R. Shields
Inventor
J. W. Madigin

UNITED STATES PATENT OFFICE.

JACOB WILFRID MADIGIN, OF TORONTO, CANADA.

SECONDARY BATTERY.

SPECIFICATION forming part of Letters Patent No. 718,489, dated January 13, 1903.

Application filed February 5, 1902. Serial No. 92,660. (No model.)

*To all whom it may concern:*

Be it known that I, JACOB WILFRID MADIGIN, of the city of Toronto, in the county of York, in the Province of Ontario, Canada, have invented certain new and useful Improvements in Storage or Secondary Batteries, of which the following is a specification.

My invention relates to improvements in storage or secondary batteries; and the object of the invention is to produce a battery of a minimum weight of electrodes with a maximum surface for a given size of containing jar or cell, to so construct an electrode as to prevent shedding of the active material and consequent short-circuiting, to insure immunity from buckling, to so construct the electrode that there will be a low internal resistance and a high rate of discharge, to provide for electrolytic action notwithstanding the electrolyte may sink low in the cell, and to provide a simple connection of low resistance whereby any single cell or set of cells may be removed from the group expeditiously and without destroying the connection. To carry out these objects, I have constructed the electrodes, the separating plates or sheets, and connections in the manner which I shall presently describe.

Figure 1:
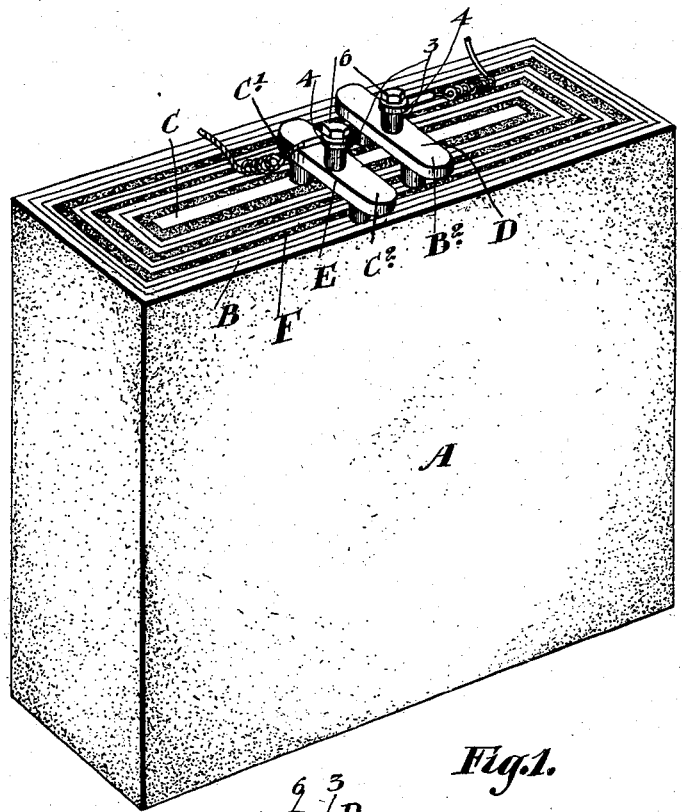
Figure 2:
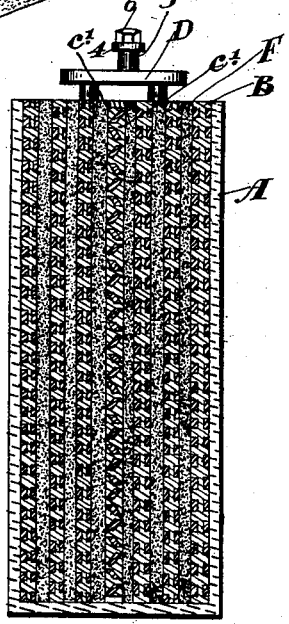

Figure 1 is a perspective view of a cell having the connections and disposition of the electrodes at the top. Fig. 2 is a vertical section. Fig. 3 is a detail of one of the outer electrodes. Fig. 4 is a detail of the central electrode. Fig. 5 is a sectional plan. Fig. 6 is an enlarged detail showing the binding-posts' connections.

In the drawings like letters of reference indicate corresponding parts in each figure.

A is a cell, which is made of any suitable material, such as rubber or glass.

B represents the outer electrodes, which are made rectangular in form and out of a single sheet of metal folded at $b$ and connected to a vertical post B', the opposite end being also connected to the vertical posts B' at the opposite side. The folded end $b$ and the free ends $b'$ are suitably burned into grooves $b^2$ at the opposite sides of the post B'. The double plate thus formed, which is preferably rectangular in cross-section, has its members slightly separated, and between the members the active material is placed, such active material being pasted so as to extend through the perforations of the plate. Each of the external plates is so formed. The innermost or central plate C is, however, formed up with horizontal corrugations $c$ and is also perforated. The plate C has burned onto it also a bounding edge C'. The space between the corrugations $c$ of the central plate C is filled with active material and the plate suitably pasted to the outside of the corrugations and through such perforations. Suitable binding or connecting posts $B^2$ and $C^2$ are secured to the top of the plates or electrodes B and C, respectively. The electrodes are placed one within the other, as indicated in Figs. 1 and 5. The electrode C is placed in the center. The binding-post $B^2$ and $C^2$ of the positive and negative electrodes are connected together by cross-bars D and E, respectively. The electrodes are, however, separated by rectangular separating plates or sheets of fiber, cellulose, or wood fiber, which is chemically treated with a neutral salt. These separating-plates are porous, and consequently the electrolyte by capillary attraction is drawn from the bottom of the cell up to the top of the electrodes. It will thus be seen that if there is not enough electrolyte in the cell the electrolytic action will still take place on account of the juxtaposition of the separating and insulating plates F and the capillary attraction resulting in the use of the separating material or plates between the electrodes. The terminals are connected to the positive and negative bars D and E, as indicated in Fig. 6, by means of the posts 3, formed of lead and integral with the bar and tapered, as shown, the sleeve 4 fitting the posts and provided with stems through which the ends of the wires extend. The sleeves 4 are held in position by means of a nut 6, of lead, in which is sunk a nut 7 of iron, but completely surrounded by the lead. The nut 7 is brought with the threaded orifice 8 over the iron screw-pin 9, which is cast in the post 3.

When the nut is screwed home, it will be seen that there will be no danger of the electrolyte coming in contact with any of the connections, and consequently no danger of sulfating. It will be seen from this description that I have produced a battery in which the danger from short-circuiting, which is a most important desideratum, is minimized, if not avoided. All danger of buckling is also provided against and there is equal expansion from either side. As each plate is made of a single sheet it will be seen that a low internal resistance is insured and consequent high rate of discharge. Seeing that the insulating material is porous between the electrodes and fills up the space therebetween, it will be understood that the electrolytic action will be most advantageous, and all shedding of the electrode will be avoided. It will also be understood to those familiar with the art that the insulating walls or plates between the electrodes prevent sulfating or any deleterious action of the electrolyte on the grid of the electrode.

The mode of action between the cells or batteries is very simple, and any liability of the connections sulfating is avoided.

It will be noticed that the central grid or electrode being horizontally corrugated and having a bounding-rim is particularly advantageous, as far as expansion and contraction are concerned, on account of the corrugations making it elastic, and therefore the danger of buckling of this plate is reduced to a minimum.

As the corrugated plate is entirely covered with active material it will be understood that the grid will be completely protected from electrolytic action.

What I claim as my invention is—

1. In a storage or secondary battery, an electrode comprising a folded and perforated sheet of lead, two portions of the fold being separated to contain the active material and bent to form a tubular grid, and a post to the opposite sides of which the folded end of the double plate and the free ends of such plate are fixed as and for the purpose specified.

2. A storage battery comprising a suitable containing-cell and a series of electrodes one encompassing the other and each comprising a folded and perforated sheet of lead, two portions of the fold being separated to contain the active material and bent to form a tubular grid, and a post to the opposite sides of which the folded end of the double plate and the free ends of such plate are fixed as and for the purpose specified.

3. A storage battery comprising a suitable containing-cell and a series of electrodes one encompassing the other and each comprising a folded and perforated sheet of lead, two portions of the fold being separated to contain the active material and bent to form a tubular grid and a post to the opposite sides of which the folded end of the double plate and the free ends of such plate are fixed and insulating porous encompassing-sheets separating the encompassing-electrodes as and for the purpose specified.

4. A storage battery comprising a suitable containing-cell and a series of electrodes one encompassing the other and each comprising a folded and perforated sheet of lead, two portions of the fold being separated to contain the active material and bent to form a tubular grid, and a post to the opposite sides of which the folded end of the double plate and the free ends of such plate are fixed, and a fibrous cellulose sheet chemically treated with a neutral salt and designed to separate the encompassing-electrodes as and for the purpose specified.

5. A storage battery comprising a suitable containing-cell and a series of electrodes one encompassing the other and each comprising a folded and perforated sheet of lead, two portions of the fold being separated to contain the active material and bent to form a tubular grid, and a post to the opposite sides of which the folded end of the double plate and the free ends of such plate are fixed, and a central electrode comprising a horizontally corrugated and perforated plate provided with a suitable bounding edge and suitable terminals for both positive and negative electrodes as and for the purpose specified.

6. In a storage or secondary battery, an electrode comprising plates of sheet-lead horizontally corrugated and provided with a bounding edge and a suitable terminal as and for the purpose specified.

JACOB WILFRID MADIGIN.

Witnesses:
B. BOYD,
M. McLAREN.